July 11, 1939.   J. CANETTA   2,165,995
ORIFICE CONTROL DEVICE
Filed Oct. 16, 1936
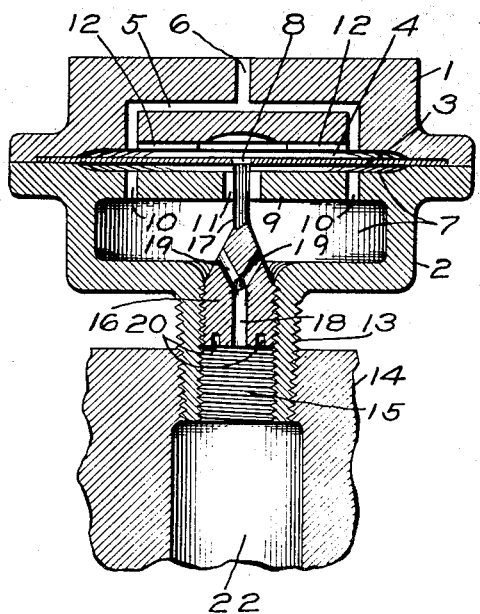
INVENTOR
JOHN CANETTA
BY Wm. W. Cady
ATTORNEY Patented July 11, 1939

2,165,995

UNITED STATES PATENT OFFICE 2,165,995

ORIFICE CONTROL DEVICE

John Canetta, Wilkinsburg, Pa., assignor to Westinghouse Air Brake Company, Wilmerding, Pa., a corporation of Pennsylvania Application October 16, 1936, Serial No. 105,973

3 Claims. (Cl. 138—46)

This invention relates to throttling devices or means for controlling the flow of fluid under pressure, particularly adapted, though not limited, for use in connection with fluid pressure brake devices.

The operation of many devices employed in connection with fluid pressure brake equipment is dependent upon a very exact control of the flow of fluid under pressure, and such control has heretofore been usually obtained by varying the size of orifices, many of which are relatively small. Small orifices, however, do not fully meet practical requirements due to the possibility of their becoming clogged or closed by foreign matter carried along by the fluid under pressure which flows through the orifices. If small orifices in a brake control device should become thus clogged or closed, the device might fail to operate, or might even be caused to operate in such a manner as to interfere with the control of brakes on a train.

In order to avoid the use of relatively small orifices and provide an arrangement which will furnish the equivalent rate of flow, but which will not be so liable to become clogged or closed, it has been proposed to employ a plurality of relatively large orifices arranged in a tortuous passage to control in series the flow of fluid under pressure through the passage, but the reduction in flow resulting from such an arrangement fails to meet practical requirements in view of the intricacy involved.

Where the operation of a device depends upon a predetermined variation in pressure in a chamber as controlled by flow of fluid under pressure through an orifice, if the orifice is of such size as not likely to become clogged or closed by foreign matter then it is necessary to employ a chamber having a relatively large volume to correspond with the greater flow area of the orifice, so that a larger amount of fluid under pressure must be employed which is wasteful and, therefore, undesirable, and also the size of the device is larger than desired.

From the above remarks it will be evident that it is desirable to use relatively large orifices for controlling the flow of fluid under pressure in brake controlling devices, but it is not desirable to have to provide for use with such orifices structures which are unduly intricate or bulky.

One object of the invention is, therefore, to provide relatively simple throttling means employing relatively large orifices having a flow capacity, however, which is only equivalent to that of a much smaller orifice.

Another object of the invention is to provide a throttling device having relatively large flow orifices and means for reducing the flow of fluid under pressure through said orifices to a degree equivalent to that through a smaller orifice.

Other objects and advantages will be apparent from the following more detailed description of the invention.

In the accompanying drawing, the single figure is a sectional view of a throttling device embodying the invention.

As shown in the drawing, the throttling device comprises two casing sections 1 and 2 secured together, and disposed and clamped around its edge between said sections is a flexible, disc-like diaphragm 3. The diaphragm 3 may be made of any suitable material such as relative thin sheet metal or rubber and has at one side a chamber 4, which in the present embodiment of the invention, is open to the atmosphere through passages 5 and 6. The diaphragm has at the opposite side a chamber 7 and is provided centrally with an aperture or orifice 8 connecting chambers 4 and 7. The chamber 7 is formed in two parts separated by a dividing wall 9 through which there are provided a plurality of passages 10 and a central passage 11, connecting the parts of chamber 7. The purpose of the dividing wall 9 is to provide a stop to limit deflection of the diaphragm 3 in a downwardly direction, while deflection in an upwardly direction is adapted to be limited by engagement with the end wall of chamber 3, in which end wall there are provided a plurality of relief slots 12 for maintaining communication from aperture 8 to the vent passage 5 when said diaphragm engages said end wall.

The casing section 2 is provided with a stud 13 adapted to be secured to the casing 14 of any fluid pressure brake device or the like by screw threaded engagement. The stud 13 is provided with a bore 15 in axial alignment with the aperture 8 in the flexible diaphragm 3. A plug 16 is disposed in the bore 15 and has screw threaded engagement with the side wall thereof. This plug has an extended axial portion or plunger 17 which is reduced in diameter to a size just sufficiently less than that of aperture 8 as to enter said aperture upon downward deflection of the diaphragm, and the end of this plunger is squared with respect to its axis so that upon slight movement of the diaphragm 3 away from the end of the plunger, the full or maximum venting capacity of the aperture 8 will be obtained. A choke bore or orifice 18 is provided in the screw threaded portion of the plug 16 and is open at one end to bore 15 and at the opposite end to a plurality of radial ports 19 which lead to chamber 7. A pair of diametrically opposite recesses 20 are provided in the end face of the plug 16 to receive the prongs of a spanner tool (not shown) whereby said plug may be turned in the stud 13 to adjust the end of plunger 17 relative to the aperture 8 when diaphragm 3 is in its neutral, unflexed position. Normally, this adjustment is such that the lower end of aperture 8 is just substantially closed by plunger 17, as will be more fully described hereinafter.

The casing 14 is provided with a passage 22 from which it is desired to release fluid under pressure at a predetermined, restricted rate, and this passage is connected to bore 15 in stud 13.

In operation, fluid under pressure supplied to passage 22 for release to the atmosphere flows from said passage through bore 15 in stud 13, choke bore 18 and ports 19 to chamber 7 at the lower face of the diaphragm 4 and when sufficient pressure is obtained thereon to overcome the resistance to deflection of the diaphragm, said diaphragm flexes upwardly away from the end of plunger 17 whereupon fluid under pressure flows from chamber 7 through aperture 8 to chamber 4 and from thence through the passages 5 and 6 to the atmosphere.

The flow capacity of aperture 8 is such as to vent fluid under pressure from chamber 7 at a faster rate than it is supplied through the choke bore 18 in the plug 16, so that upon opening aperture 8, the pressure in chamber 7 will be reduced through said aperture sufficiently to permit the diaphragm 4 to return to the position in which the plunger 17 closes said aperture. The pressure of fluid then builds up again in chamber 7 sufficiently to flex the diaphragm 4 to open aperture 8 and permit further venting of fluid under pressure from chamber 7 following which said diaphragm again returns to the position for closing aperture 8. The diaphragm 3 thus vibrates back and forth to permit an intermittent release of fluid under pressure from chamber 7 and thereby passage 22 until the pressure obtained in chamber 7 from passage 22 becomes reduced to a degree which is only slightly greater than the opposing pressure acting in chamber 4 on the diaphragm. When the pressure in passage 22 becomes thus reduced, the supply of fluid under pressure to chamber 7 is at such a low rate that a sufficient differential of pressures is not obtained on diaphragm 4 to open the aperture 8 wide, the aperture 8 being opened only sufficiently to permit the pressure in chamber 7 to reduce at the same rate as it is supplied to said chamber. As the pressure obtained in chamber 7 continues to reduce, the diaphragm 3 will move toward the plunger 17 and gradually close communication from chamber 7 to aperture 8, until at substantial equalization of pressures on said diaphragm, the plunger 17, in case the diaphragm 3 is made of relatively flexible material, will substantially close the vent communication through aperture 8. While in this position of plunger 17 there may be slight leakage past the plunger through the aperture 8, it is desired that the clearance space between the plunger and the aperture be sufficiently small that when fluid under pressure is supplied to chamber 7 the pressure therein may promptly increase sufficiently to cause prompt cycling operation of the diaphragm to release fluid under pressure, as above described. In case the diaphragm is made of relatively rigid material the plunger 17 may then be adjusted to provide slight clearance between the end thereof and the diaphragm when in its neutral position so as to ensure a final equalization of pressures through the aperture 8 on the opposite sides of the diaphragm after the diaphragm ceases to oscillate.

From the above description, it will be noted that the rate of release of fluid under pressure from the passage 22 is controlled by the capacity of choke 18 to supply fluid under pressure to chamber 7 and the capacity of aperture 8, which is arranged in series with choke 18, to release fluid under pressure from chamber 7, as it is intermittently opened and closed. This intermittent venting of fluid under pressure through the aperture 8 reduces the amount of fluid under pressure released from passage 22 in a given period of time to a degree less than would occur through said aperture and choke 18 if the venting were continuous, or, in other words, permits the use of orifices having a greater flow capacity than would be permissible for use in a construction in which the venting was continuous. By the use of these larger orifices the possibility of their becoming clogged or closed by foreign matter, which may be in the fluid pressure supplied thereto, is much less than if smaller orifices were employed.

The flexing of the diaphragm 3 through its cycles of operation will be at a rapid rate and in order to prevent the flexing, as influenced by inertia, from becoming excessive, the wall 9 is provided to limit the flexure in one direction and the upper wall of chamber 4 is so located as to limit flexure in the opposite direction.

Since the vibrating or oscillating operation of the diaphragm 3 is dependent upon a predetermined differential between the opposing fluid pressures acting thereon, it will be evident that such operation is not dependent upon chamber 4 being at substantially atmospheric pressure, but chamber 4 may, if desired, be at a pressure exceeding atmospheric pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A device for controlling the rate of flow of fluid under pressure comprising a flexible diaphragm having at one side a chamber supplied with fluid under pressure and having an aperture through which fluid is adapted to be vented from said chamber, an element in said chamber of a size to freely enter said aperture and to thereby substantially close communication through said aperture, said element having an end the periphery of which is disposed in substantially the same plane as the chamber side of said diaphragm when said diaphragm is in an unflexed condition, and means for restricting the rate of supply of fluid under pressure to said chamber, to such a degree with respect to the venting capacity of said aperture, that when said diaphragm is deflected by fluid under pressure supplied to said chamber and thereby opens communication through said aperture, a sudden reduction in the pressure in said chamber will occur through said aperture.

2. A device for controlling the rate of flow of fluid under pressure comprising a casing, a flexible diaphragm in said casing having at one side a chamber supplied with fluid under pressure and having an aperture through which fluid under pressure is adapted to be vented from said chamber, said diaphragm having a normal position and being deflectable in either direction therefrom, stop means in said casing engageable by said diaphragm for limiting deflection thereof in both directions from normal position, an element in said chamber of a size to freely enter said aperture and to thereby substantially close communication through said aperture, said element being so disposed that when said diaphragm is in its normal position the end of said element substantially closes communication through said aperture but when said diaphragm is deflected into substantial engagement with said stop means upon the supply of fluid under pressure to said chamber the end of said element is withdrawn from said aperture, and means for restricting the rate of supply of fluid under pressure to said chamber to a degree such that when said element is withdrawn from said aperture, a sudden reduction in the fluid pressure in said chamber will occur.

3. A device for controlling the rate of flow of fluid under pressure comprising a casing, a flexible diaphragm in said casing having at one side a chamber supplied with fluid under pressure and having an aperture through which fluid under pressure is adapted to be vented from said chamber, said casing having a projection screw-threaded exteriorly and provided with an internal screw-threaded bore open at one end to said chamber in axial alignment with said aperture and through which fluid under pressure is adapted to be supplied to said chamber, a plug screw-threaded in said bore, an element in said chamber carried by said plug in axial alignment with said aperture, said element being of such diameter as to freely enter said aperture and to thereby substantially close communication through said aperture, said element having an end the periphery of which is adjusted by said plug to just substantially close said communication when said diaphragm is in its normal position, said plug having a restricted opening connecting said chamber at the one end of said plug to the bore at the opposite end, said opening being so restricted with respect to the flow capacity of said aperture that when said aperture is opened upon deflection of said diaphragm by fluid under pressure supplied to said chamber, a sudden reduction in the pressure of fluid in said chamber will occur.

JOHN CANETTA.